United States Patent
Murrell et al.

[11] Patent Number: 5,935,889
[45] Date of Patent: Aug. 10, 1999

[54] CATALYST AND METHOD OF PREPARATION

[75] Inventors: Lawrence Lee Murrell, South Plainfield; Rudolf Alfred Overbeek, Chatham Township; Ali M. Khonsari, Bloomfield, all of N.J.

[73] Assignee: ABB Lummus Global Inc., Bloomfield, N.J.

[21] Appl. No.: 08/726,367

[22] Filed: Oct. 4, 1996

[51] Int. Cl.⁶ .............................. B01J 21/04; B01J 35/08
[52] U.S. Cl. .................... 502/9; 502/8; 502/355; 502/439
[58] Field of Search .................... 502/8, 9, 321, 502/324, 355, 439

[56] References Cited

U.S. PATENT DOCUMENTS

| | | | |
|---|---|---|---|
| 3,196,827 | 7/1965 | Wurster et al. | 118/24 |
| 4,073,750 | 2/1978 | Yates et al. | 252/459 |
| 4,283,583 | 8/1981 | Velenyi et al. | 585/467 |
| 4,689,297 | 8/1987 | Good et al. | 435/174 |
| 4,945,079 | 7/1990 | Pedersen et al. | 502/314 |
| 4,977,126 | 12/1990 | Mauldin et al. | 502/242 |
| 5,200,382 | 4/1993 | Cody et al. | 502/204 |
| 5,236,503 | 8/1993 | Jones | 118/303 |
| 5,437,889 | 8/1995 | Jones | 427/185 |
| 5,625,015 | 4/1997 | Brinen et al. | 526/160 |

FOREIGN PATENT DOCUMENTS

0 715 889 A2  6/1996  European Pat. Off. .
40 06 935 A1  9/1991  Germany .

OTHER PUBLICATIONS

Rompp Chemie Lexikon, Georg Thiene Verlag, Stuttgart—New York, pp. 178–179, 1183–1189, 2298–2305, 4268–4271. No Month.

Rompp Lexikon Biotechnologie, Georg Thiene Verlag, Stuttgart—New York, pp. 742–743, 466–469. No Month.

"Fluidized Bed Processing and Drying", Jones, David M., Copyright International Society for Pharmaceutical Engineering, 1991. No Month.

"Bottom Spray Processing—The Wurster HS", Glatt Air Techniques, Inc., 1986/87 No Month.

Bottom Spray Processing–The Wurster HS, Glatt Air Techniques, Inc, 1987, No Month.

*Primary Examiner*—Michael Lewis
*Assistant Examiner*—Alexander G. Ghyka
*Attorney, Agent, or Firm*—Alix, Yale & Ristas, LLP

[57] ABSTRACT

Catalyst particles are prepared by coating a core particle, which is usually catalytically inert with respect to the intended chemical reaction, in a fluidized bed coating apparatus. The coating technique involves repeatedly applying and drying small quantities of an atomized slurry containing the coating material in the form of a colloidal dispersion or in the form of very fine, non-colloidal particles preferably mixed with colloidal particles. In this way, incremental layers are formed to produce a final thin shell which has a highly uniform thickness, which is formed on the surface of the core and which does not penetrate porous cores. Various methods are disclosed for converting the coated particles to the desired catalyst form.

24 Claims, 8 Drawing Sheets

91 μm

91 μm

CATALYST AND METHOD OF PREPARATION

This invention was made with United States Government support under Award Number 70NANB5H1141 awarded by the U.S. Department of Commerce. The United States Government has certain rights in the invention.

BACKGROUND OF THE INVENTION

The present invention relates to solid catalysts and to the method of preparation. Specifically, the invention relates to the method of producing catalysts having a core which is usually catalytically inactive, with a thin outer shell bonded to the core and containing a catalytically active material. One particular embodiment of the invention includes the formation of an acidic alkylating catalyst having a catalytically inactive core and a thin outer shell containing the acid catalyst.

The use of solid catalyst comprised of small particles containing catalytically active materials on the surface thereof are desirable for a wide variety of chemical reactions. As one example, it would often be desirable in certain catalyzed chemical reactions which are historically catalyzed by liquid catalyst to replace the liquid catalysts with solid catalyst to simplify the process, and to reduce environmental concerns associated with such liquid catalyst. As one example, the production of highly branched hydrocarbons such as trimethylpentane for use as gasoline blending components for octane enhancement traditionally involves alkylation using conventional strong liquid catalysts such as hydrofluoric or sulfuric acid. The use of these liquid acid catalysts creates certain environmental concerns. With hydrofluoric acid, the concern is the possibility of the release of toxic vapors. With sulfuric acid, there is no acute toxic release problem, but there is the need to truck away and treat the waste acid which involves thermal decomposition and preparation of fresh acid. The transportation of the waste and fresh acid is closely regulated to prevent spills.

In view of the potential problems with the liquid acid catalysts such as used for alkylation, it is desirable to use less hazardous and toxic and more environmentally acceptable catalysts. Specifically, it is desirable to use solid catalysts rather than liquid catalysts. However, the use of solid catalysts at least for certain reactions such as alkylation has not been very successful. The main problem is the very short catalyst life which is sometimes measured in terms of hours, or possibly a few days.

One type of catalyst which holds promise for such reactions comprises a catalytically inert core which is covered with a shell comprised of, or containing, the catalytically active material. Such thin film or shell catalysts are not in themselves novel and have been disclosed in patents such as U.S. Pat. Nos. 4,394,251; 4,793,980; 4,427,577; 4,677,089; 4,378,308; 5,082,814; 5,200,382 and European Patent Application No. 323,735. These supported catalysts of the prior art are characterized by a number of factors which influence their usefulness. One is the penetration of the catalytic coating into the core when a porous core material such as alpha-alumina is used. It is well known to those skilled in the art that porous supports can be impregnated with a solution containing a catalyst precursor which fills the pores within the oxide support. This method is often referred to as the dry impregnation method or the incipient wetness method. Impregnation using slurries containing colloidal particles, i.e., a sol, using this prior art technique shows that there is substantial penetration of the sol into the substrate. This, as well as the coating techniques themselves, result to varying degrees in a non-uniform coating thickness. In addition, prior art preparation methods result in a range of pore diameters and in films of various thicknesses. The pore diameters within the film and the film thicknesses strongly influence the rate of diffusion of the reactants to the active sites in the pores and of the reaction products out of the film. As the pore diameters decrease and as the film thicknesses increase, the diffusion of reactants and products will lead to deleterious reaction products which foul the catalyst surface. This concept of catalyst deactivation has been recognized in the published literature. A high flux of reactants and products is necessary to obtain a high number of molecules reacted per unit of time for each active catalyst site and, more importantly, to suppress undesired reaction products which foul the surface. This is partially due to the long residence time within the intricate network of pores resulting in unwanted side reactions in conventional catalyst or in thin film catalysts of uncontrolled film thickness. Although it has been known that it would be desirable to concentrate the catalyst sites in a thin layer on the surface of a core particle, the techniques for forming such a uniform layer have not been satisfactory. Therefore, we have sought a method of catalyst preparation where it would be possible to prepare uniform thin films, or thin shells, of controllable thickness comprising catalysts or catalytic supports on a wide variety of substrates.

SUMMARY OF THE INVENTION

The invention involves an improvement in solid catalysts and particularly to the method for forming such catalysts. More specifically, the catalyst comprises a core material, which is usually catalytically inert, on which is deposited and bonded a thin shell of material containing catalytically active sites without penetration of the shell material into the pores in the core. The thin shell is formed by a deposition process which uses a fluidized bed coating technique which involves repeatedly applying and drying small quantities of a slurry containing the shell material wherein the slurry is in the form of a colloidal dispersion, or sol, or where the slurry contains very fine, non-colloidal particles preferably mixed with colloidal particles. Incremental layers are deposited and dried to form the final thin shell which has a highly uniform thickness which is usually less than 200 microns, and more preferably less than 75 microns. The catalyst material can be a part of the shell forming material, or can be added to the formed shell, or can be formed by subsequent reaction with the formed shell. The catalyst particles formed by the present invention may be used for a wide variety of chemical reactions including the alkylation reactions previously discussed.

DESCRIPTION OF THE PREFERRED EMBODIMENTS

Figure 1:
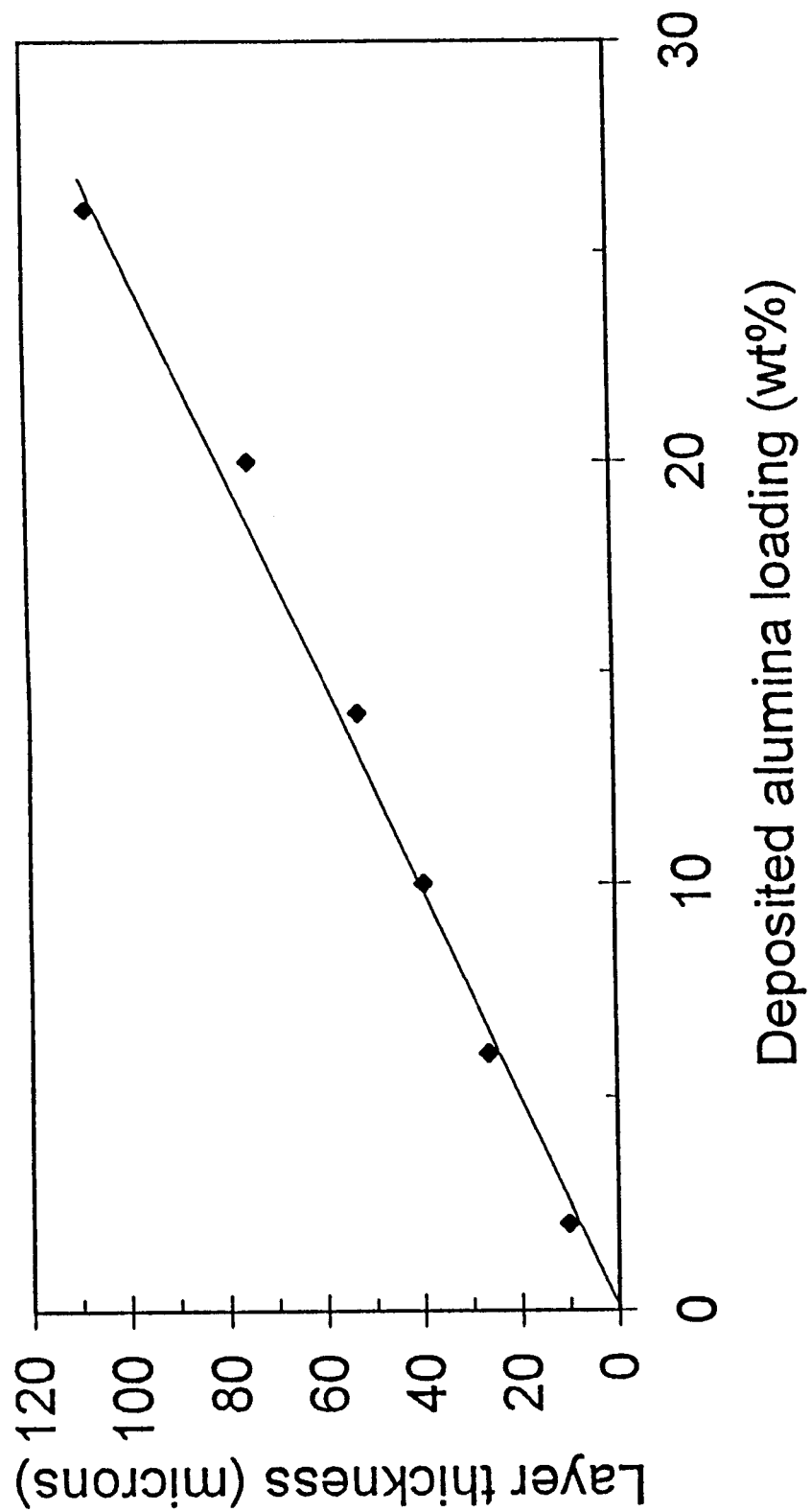
FIG. 1 is a graph illustrating the thickness of the film deposited on 1 mm α- alumina spheres as a function of the loading using an alumina sol according to the present invention.

The catalyst of the present invention comprises a core, which is preferably a catalytically inactive material, with a thin shell formed on the core comprised of or containing the catalytically active material. The core usually comprises alpha alumina particles but may be formed from particles or microspheres of transitional alumina, silica, zeolites, zirconia, titania, clay minerals, silicon carbide or their mixtures. The core may also be formed from non-porous materials such as hollow spheres of inorganic materials, such as silica or alumina, metal, clay minerals, silicon carbide, silicon nitride, or carbon-based materials such as graphite. In some cases, a catalytically active core could lead to deactivation of the core, and more importantly, to deactivation of the thin catalytic shell. It is for that reason that the core is preferably catalytically inert. In the context of the present invention, catalytically inert means inert with respect to the particular reaction in which the catalyst is being used even though that core material may have catalytic activity with respect to some other reaction.

The invention involves the technique for forming the thin shell, and the unique catalyst particles which are formed by the use of that technique to produce a shell of uniform and controllable thickness over the core, without penetration of the shell material into the pores which may exist in the core.

The present invention uses what is generally referred to as a fluidized bed coating technique which has been used in other technologies, particularly in the pharmaceutical industry for forming coatings of drugs onto benign sugar core materials which act as seeds for the drug coating. The general principle of the fluidized bed coating process employed in the present invention is that the particles to be coated are suspended in an air stream designed to fluidize the particles and carry them through an atomized spray of the coating material. In the preferred arrangement, there is a cyclic flow of the particles past a nozzle arrangement such that only a very thin, partial coating is produced on each pass of the particles through the atomized spray in the coating zone. The partially coated particles, which are then further lifted in the air stream and dried, settle out and descend to begin another cycle. The cycles are continued until the desired thickness of coating is achieved.

Although the present invention is not limited to any particular type, or brand, of fluidized bed coaters or coating processes, one type that has been found to be particularly useful and is given by way of example only, is known as Wurster coaters or the Wurster process named after one of the original inventors, Dale E. Wurster. In this regard, see U.S. Pat. No. 3,196,827 and some of the later patents relating to this coating technique such as U.S. Pat. Nos. 5,236,503 and 5,437,889, all of which are incorporated herein by reference. In this process, the nozzle is located such that the travel distance of the liquid or suspension droplet from the nozzle is minimized. The coated particles are lifted on the air stream which dries the coating as the particles are carried upward. Because the system uses large volumes of air, it has a large drying capacity. Also, because the particles are separated from each other as they are carried on the air stream and coated, it is possible to coat a wide range of particle sizes including very small core particles (less than 50 microns) while at the same time controlling and minimizing agglomeration.

The preferred system consists of a conically shaped product container with an open ended cylindrical inner partition. An air distribution plate is located at the lower end of the production container to distribute the fluidization air between the inner and outer partitions. The majority of the air is channeled through the inner partition leaving sufficient air flow to suspend particles in the outer partition. Particles are drawn into the inner partition by the pressure differential created by the difference in air velocities between the two partitions. The particles are carried through the inner partition and into the expansion chamber. As gravity overcomes the force of the fluidizing air, the particles fall back into the outer partition where they are suspended in a slowly, downwardly moving bed. The coating solution is added via a pneumatically atomized nozzle located at the center of the air distributor plate. The nozzle sprays upward, providing a co-current application of solution onto the particles. As atomized droplets of the coating liquid contact the particles in the inner partition, they spread and coalesce on the particle surface. Excess moisture from the applied liquid is evaporated as the particles continue traveling through the system.

More specifically, a product container section opens upwardly into an expansion chamber and downwardly into a lower plenum chamber through a generally horizontally disposed air distribution plate having openings formed therethrough for the upward air flow from said lower plenum chamber into said product container section. The product container section includes a substantially cylindrical partition spaced above the air distribution plate for dividing the product container section into an inner up-bed area and an outer down-bed area. An upwardly discharging spray nozzle is mounted substantially centrally within the cylindrical partition. For more details on the process and the apparatus used in the process, see the previously mentioned U.S. Pat. No. 3,196,827 and U.S. Pat. Nos. 5,236,503 and 5,437,889.

The range of core particle sizes for the catalyst of the present invention can range from 5 microns (0.005 mm) up to 20,000 microns (20 mm) with the preferred range being 0.03 mm up to 1.0 mm. Depending upon the size and density of the core particles, the operating conditions for the fluidized bed coating process would be adjusted accordingly to maintain the desired fluidizing conditions coupled with the control of the drying conditions. It is also possible to carry out the coating process using a fluid bed coating technique which relies on mechanical means to produce the fluidization within the coating chamber.

The preferred coating material for producing the shell on the catalyst particles of the present invention is an alumina colloidal dispersion or sol. However, other coating materials may be employed in the present invention such as clay minerals, zeolites, titania, zirconia, ceria, silica, magnesium oxide, rare earth oxides and their mixtures. The coating material can be used in the form of a sol or in the form of a liquid dispersion of small, non-colloidal particles preferably mixed with colloidal particles which serve as the binder. As an example, the suspended coating particles may be alumina particles from 2 millimicrons (2 nanometers) up to 10 or more micron size particles. The coating slurry may even contain milled particles of up to 100 microns diameter but preferably less than 10 microns. Typically, the coating material is a sol of a transitional alumina precursor, such as boehmite or pseudoboehmite formed with an average particle size of 2–100 nm (2–100 millimicrons). Another typical coating material is a slurry containing milled commercially available transitional alumina with an average particle size of about 4 microns and containing 10–90% by weight colloidal alumina particles in the slurry. In the usual case of slurries in which the particles are larger than in sols, the slurry contains a separate binder phase which may actually be a quantity of alumina sol, or a binder created in situ by adding acetic or other acids to the transitional alumina slurry prior to milling of the alumina to reduce the particle size. As used herein, the term slurry includes sols as well as liquid dispersions of fine, non-colloidal size particles.

As indicated, an object of the invention is to produce a thin coating as well as a uniformly thick, homogeneous coating. The use of the fluidized bed coating process such as the Wurster process produces the uniform and homogeneous coating, and is capable of producing the desired thin coatings by merely controlling the duration of the coating cycle. The desired coating thickness may vary depending upon the particular catalyst being produced, but the preferred range of thicknesses is between about 0.1 microns and 100 microns.

In the fluidized coating process, the atomized spray of the slurry produces very fine droplets, perhaps on the order of 1 micron. In each pass of the particles through the atomized spray, only a small percentage of the surface of the core particle is coated, perhaps only 2 or 3%. The successive passes of the particles through the atomized spray and the drying of the coating between each pass produces the uniform film. Determination of the BET (Brunauer, Emmett and Teller) surface area of samples removed at different times demonstrates that there is a uniform rate of deposition of the slurry onto the core particles and that there is a continual build-up of the layers of the shell. It is further shown by cross-sectional scanning electron microscopy that the deposition of the gamma-alumina sol onto alpha-alumina spheres according to the present invention produces a film or shell which is exclusively on the exterior surface of the alpha-alumina spheres and does not penetrate into the pores.

In the embodiment of the invention where the film is formed from an alumina sol containing boehmite or pseudoboehmite, this precursor is treated in air, or in an inert gas atmosphere, or in a mixture of the two gases, in each case with or without steam, to convert the boehmite or pseudoboehmite phase in the thin film to a transitional alumina phase. Temperatures of 200–1100° C. can be employed to give the desired combination of physical and chemical characteristics in the transitional alumina film. The gas atmosphere may contain the steam at different amounts to control the conversion process to the most desirable surface area and pore size within the film according to known techniques.

In the case where the thin films of the instant invention, formed on a relatively inert core, are transitional aluminas, then the film can be converted to a solid acid catalyst by a wide number of techniques that are well known to those skilled in the art. In this regard, see U.S. Pat. No. 2,999,074 (Block), U.S. Pat. No. 4,433,191 (Eleasar), U.S. Pat. No. 4,347,399 (Rice) and U.S. Pat. No. 4,179,581 (Mitzche). In general, the film can be converted to an acid catalyst by halogenating or sulfating.

As an example, the transitional alumina films which have been formed can be reacted in the gas phase with such reactive chlorine containing species as carbon tetrachloride, chloroform, sulfonyl chloride, hydrogen/hydrogen chloride mixtures, chlorine gas with/without added oxygen, etc. The time of treatment, the flow rate of the gas, and the temperature of treatment for a given film thickness are all variables which are known to effect the amount of retention of chlorine within the film and directly impact on the acidity of the film. Similarly, treatment can be carried out with fluorine containing gases such as carbon tetrafluoride, boron trifluoride, hydrogen fluoride, etc. Solids that can be vaporized/sublimed onto the alumina film can also be used to prepare solid acids by deposition of the solid within the thin film. Examples would be aluminum trichloride, antimony pentafluoride, and hydrogen boron tetrafluoride. In the application of these thin films as solid acids, it is known that there may be a continuous addition of the chloride- or fluoride-containing compounds during the reaction to maintain the activity of the solid acid catalyst in such applications as paraffin and olefin isomerization, aromatics alkylation, and gasoline alkylation.

In addition, the chlorination or fluorination can be carried out by treatment in a solvent containing reactive chlorination species such as alkyl aluminum chloride, sulfonyl chloride, etc. at a temperature from −50 to 350° C. For these solid acid catalysts prepared by treatment in the gas phase and/or by treatment in a solvent, post treatment at different temperatures between 100–900° C. may be beneficial in a variety of gas atmospheres including hydrogen, hydrogen chloride, or their mixture, air or mixtures of air diluted with an inert gas such as nitrogen, or treatment in an inert gas such as nitrogen or helium. The duration of treatment of the catalyst, the temperature of treatment, and the flow rate of the treatment gas may be used to control the acidity of these catalysts for different applications.

In the case of a thin film of zirconia or titania, preferably anatase, made on a relatively inert core, it is possible to convert the film to a strongly acidic catalyst by treatment of the catalyst with ammonium sulfate, sulfuric acid, etc. and then to treat at temperatures between 400–800° C. to form a strongly acidic solid acid catalyst. The following references exemplify the range of solid acids made by sulfation of zirconia: (1) Escalona Platero, E., Peñarroya Mentruit, M., Otero Areán, C., and Zecchina, A., *J. Catal.* 162, 268–276 (1996); (2) Hsu, C. Y., Heimbruch, C. R., Armes, C. T., and Gates, B. C., *J. Chem. Soc. Chem. Comm.* 1645, (1994); (3) Bensitel, M., Saur, O., Lavalley, J. C., and Mabilon, G., *Mater. Chem. Phys.* 17, 249 (1987); (4) Escalona Platero, E., and Peñarroya Mentruit, M., *Catal. Lett.* 30, 31 (1995); (5) Escalona Platero, E., and Peñarroya Mentruit, M., *Mater. Lett.* 14, 318 (1992); and (6) Otero Areán, C., and Escalona Platero, E., *Adsorption Sci. Technol.* 1, 159 (1984).

Another example of the present invention involves the conversion of the alumina thin films to nickel catalysts which are particularly useful for hydrogenation. Many hydrogenation reactions are very fast reactions which benefit from having small catalyst particles. The process of the present invention for forming thin film catalyst particles is one approach to having effectively small catalyst particles. The benefits are a lower catalyst inventory for a given reactor volume and lower rates of catalyst deactivation due to fouling of the catalyst surface.

Nickel catalysts on an alumina support formed by prior art processes are currently used commercially such as in catalytic distillation. The dispersion of the nickel is a key to the effective utilization of the nickel content since the dispersion directly relates to the amount of nickel surface area available for catalysis. Also, the dispersion is directly related to the size of the nickel metal particles whose exterior surface is available for catalytic function in hydrogenation. For a nickel catalyst with a dispersion of 30%, the nickel particles are about 2 nm in diameter. Information on the nickel metal dispersion allows a comparison of the effectiveness of the nickel catalysts prepared according to the present invention and the effectiveness of commercial nickel catalysts that do not possess the thin film of the present invention. In addition, it is known that nickel metal dispersions are approximately 30% for nickel/alumina catalysts similar in surface area to those produced by the present invention for nickel loadings of 14 to 18 wt. percent based on the weight of the thin film. In this regard, see U.S. Pat. No. 4,073,750 which also discloses the use of nickel metal precursors and the conversion to the nickel metal which can also be used in the present invention.

In order to make a comparison, two different nickel catalysts were prepared on thin film transitional alumina supports. One sample was prepared by the fluid bed coating process of the present invention and the other was prepared by hand coating in the laboratory to duplicate prior art coating techniques. Both were prepared using the same alumina sol as the precursor of the transitional alumina, the equivalent weight percent alumina in the thin film, the identical 1 mm alpha alumina support and the identical 15 wt. % nickel content based on the weight of the thin film. See Example 3 below. In addition to the deposit of nickel, other related metal may be deposited including copper, molybdenum, manganese, rhenium and the Group VIII metals of the Periodic Table of Elements.

Precious metal salts can also be added to the uniform thin film supports prepared by fluid bed coating procedures compared to the non-uniform film prepared by the prior art procedures. In the case of transition metal oxide precursors, such as ammonium para-molybdate, a better dispersion can be obtained for the resultant metal oxide, i.e., molybdenum oxide, for the fluid-bed-prepared thin film compared to the prior art prepared material.

Uniform alumina films formed onto a core of inert and low surface area alpha-alumina according to the present invention will exhibit the good to excellent dispersions expected of bulk particles of alumina for a wide variety of catalysts, and, in addition, will have the advantages of small particles for catalyzed reactions which can benefit from such catalyst's three-dimensional architecture.

EXAMPLE 1

One millimeter alpha-alumina spheres were coated with a commercial alumina sol of 100 nm diameter, containing 20 wt % alumina in the slurry. Experiments were performed in a Wurster coater with a 7" coating chamber. The experiments were designed such that the slurry injection was interrupted at certain calculated points in time to allow extraction of samples with various coating thicknesses. The most important conditions utilized are summarized below:

$T_{inlet\ air}$: 60° C.
$T_{product}$: 36–40° C.
Injection rate sol: 60 g/min.
Fluidization air velocity: 2 m/s
Initial α-alumina charge: 6 kg Results are presented in Table 1. This table shows the transitional alumina thin film loading, BET surface area of the sample, and the film thickness.

TABLE 1

Summary of the results obtained by coating 1 mm α-alumina spheres with alumina sol

| Sample Name | Deposited loading level (wt %) | BET SA measured (m2/g) | Layer thickness (microns) |
|---|---|---|---|
| 1-1 | 2 | 5 | 10.2 |
| 1-2 | 6 | 12.9 | 26.5 |
| 1-3 | 10 | 19.2 | 39.5 |
| 1-4 | 14 | 25.6 | 52.8 |
| 1-5 | 20 | 36 | 74.7 |
| 1-6 | 26 | 50.5 | 107 |

FIG. 1 represents the layer thickness as a function of the deposited transitional alumina loading on the spheres. As can be seen, the calculated loading increased linearly. In addition, fines formation was not apparent over this range of film thicknesses, and the total mass balance of material in the coater indicated almost 100% coating efficiency.

Figure 2:
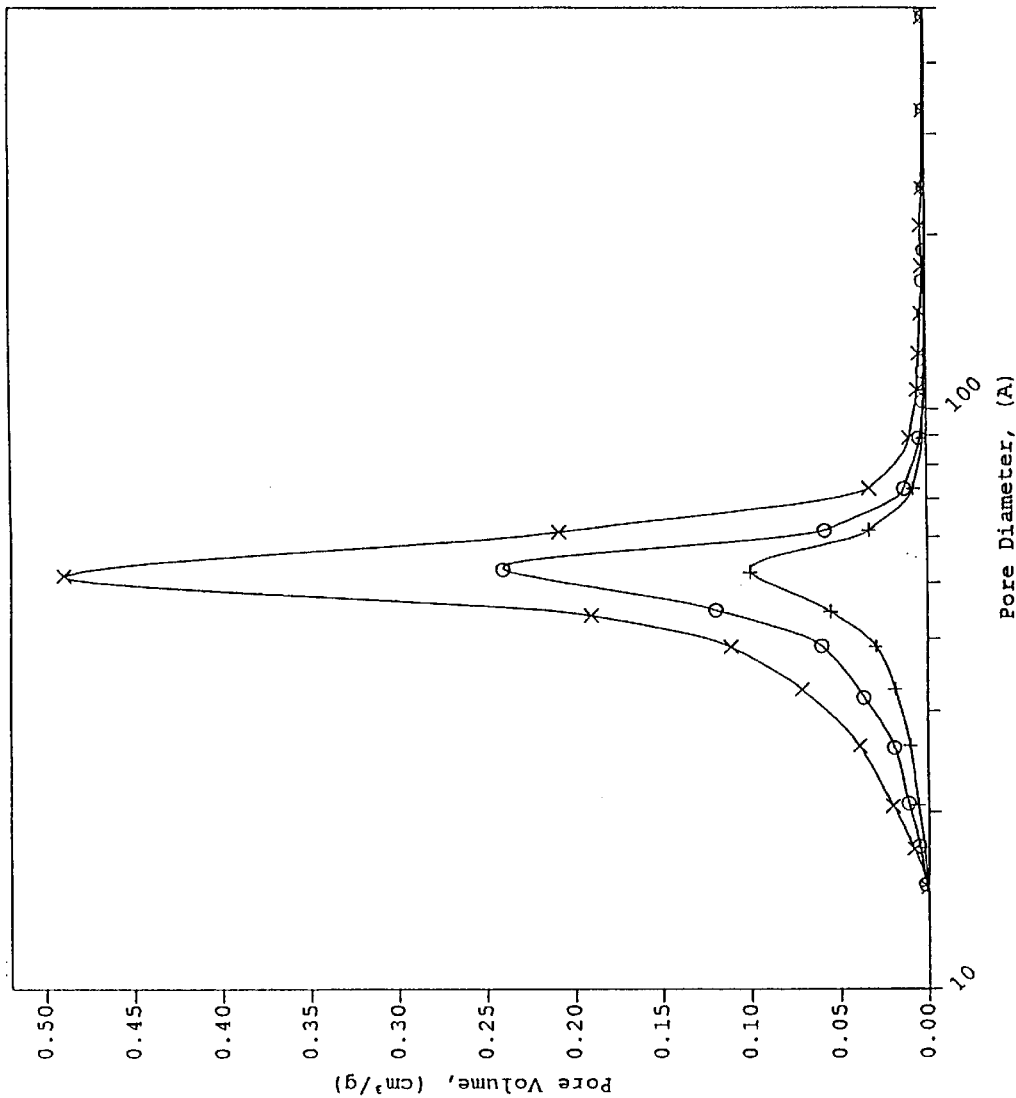
FIG. 2 is a graph illustrating the pore size distribution in the γ-alumina film formed according to the present invention at various alumina loadings.

FIG. 2 shows the pore size distribution of the alumina film measured using pulsed nitrogen physisorption. It is clear the character of the film does not change as a function of the loading, since the pore size distribution does not change. Only the quantity of pores in a specific size range change as a function of the loading. It is important to note that the pore size distribution of the film matches exactly that of the same alumina sol dried and calcined to form a transitional alumina.

Figure 3:
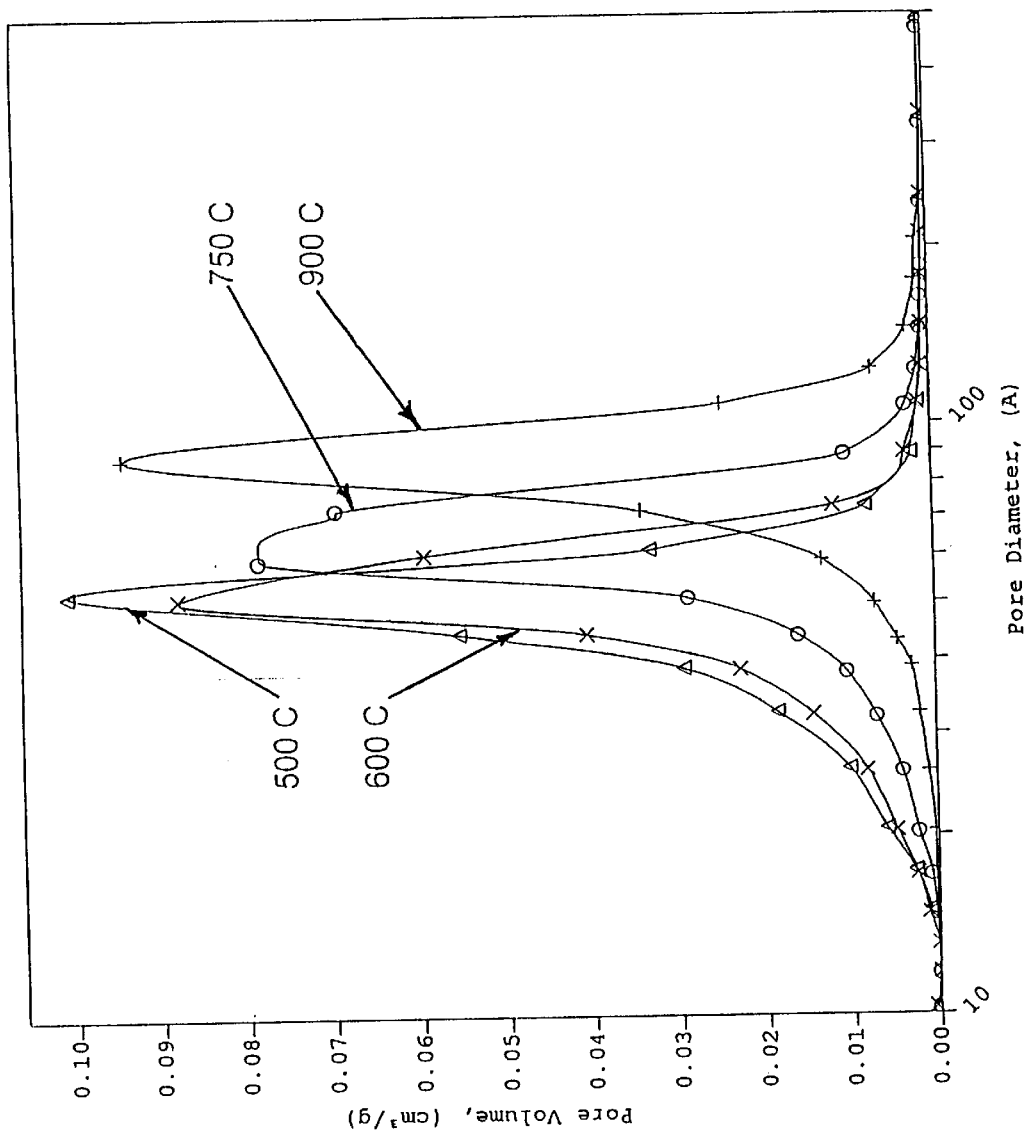
FIG. 3 is a graph illustrating the pore size distributions with a 6 wt. % γ-alumina loading calcined at various temperatures.

The pore size distribution of the film can be shifted to larger pore sizes by calcining the coated sample at varying temperatures. By increasing the calcination of a 6 wt % coated sample at temperatures from 500, to 600, to 750 and to 900° C., the average pore size increased to larger values. Results of this experiment are represented in FIG. 3. In addition the BET surface area decreased from 13.2, to 12.1, to 9.7, and finally to 6.7 m²/g, respectively. The possibility to vary both film thickness and pore size distribution gives the opportunity to fine-tune and design the properties of the catalytic film.

Figure 4A:
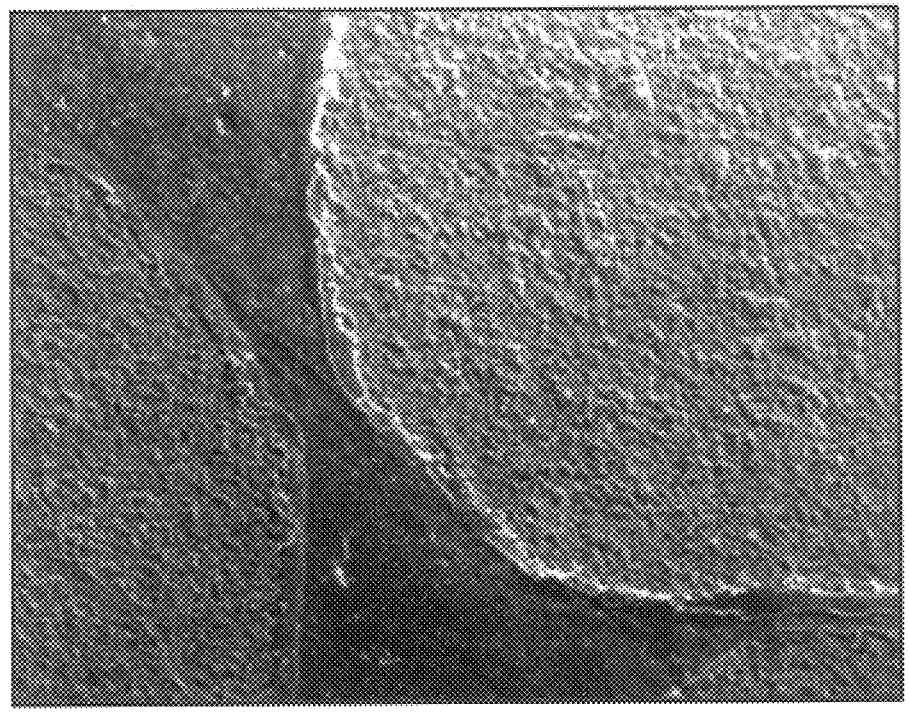
FIG. 4A is a cross-sectional scanning electron microscope image of alumina sol coated on 1 mm α-alumina spheres with a 6 wt. % loading and calcined at 500° C.
Figure 4B:
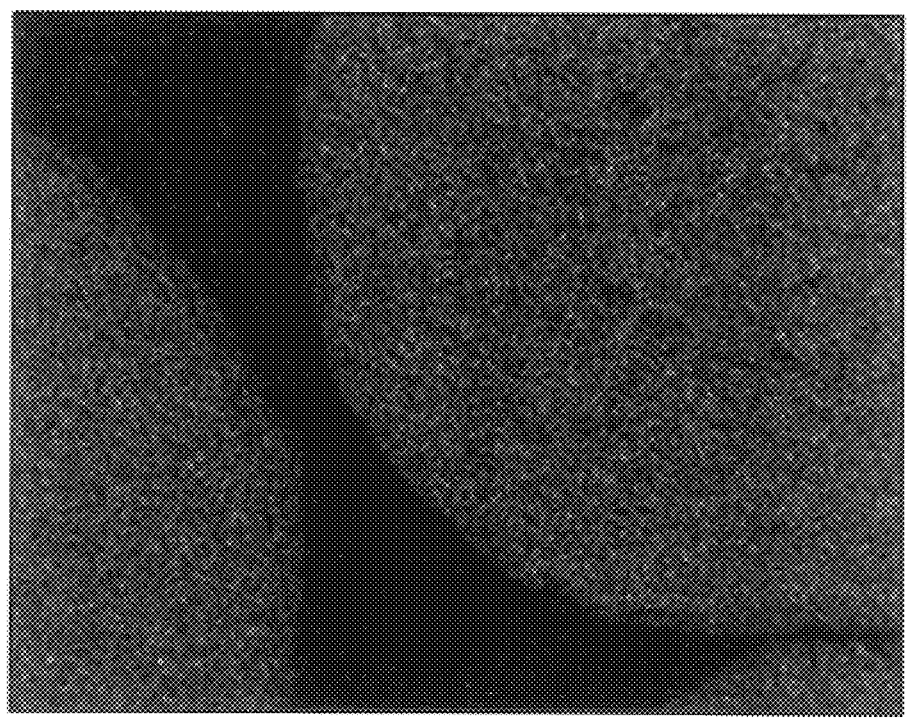
FIG. 4B is a cross-sectional EDAX aluminum map of the same particles as in FIG. 4A.

FIGS. 4A and 4B show cross sectional scanning electron microscope (SEM) analyses performed on particles having an alumina thin film loading of 6 wt %. FIG. 4B is a mapping of the aluminum using electron dispersive analysis of X-rays. As can be observed, the support particles are homogeneously coated with a film formed from the deposited sol. Furthermore, as is represented by the two separate particles shown in this figure, all particles were coated with a film of equal thickness. Higher magnifications show that the coating was deposited only at the surface, and did not penetrate the inner surface of the wide-porous α-alumina substrate. The coating thickness measured from the represented SEM pictures is approximately 25 microns. The aluminum mapping shows that the layer contained no impurities, and supports the fact that the film is very uniform. This example serves to show that uniform films are formed by depositing an alumina sol onto a porous alpha-alumina particle using the fluid bed coating procedure of this invention.

EXAMPLE 2

One millimeter alpha-alumina spheres were coated with an aqueous transitional alumina slurry, containing 10% ball-milled transitional alumina by weight with an average particle size of the alumina of about $4\mu$. A sol binder was created in situ by adding acetic acid to the transitional alumina slurry prior to ball milling the alumina. Experiments were performed in a coater with a 7" coating chamber. The experiments were designed such that the liquid injection was interrupted at certain calculated points in time to allow extraction of samples with various coating thicknesses. The most important conditions utilized are summarized below:

$T_{inlet\ air}$: 68–70° C.

$T_{product}$: 27° C.

Injection rate sol: 80 g/min.

Fluidization air velocity: 2 m/s

Initial α-alumina charge: 6 kg

Results are presented in Table 2. This table shows the transitional alumina thin film loading, BET surface area of the sample, and the film thickness.

TABLE 2

Summary of the results obtained by coating 1 mm α-alumina spheres with alumina sol

| Sample Name | Deposited loading level (wt %) | BET SA measured (m2/g) | Layer thickness (microns) |
|---|---|---|---|
| 2-1 | 2 | 5.3 | 8.8 |
| 2-2 | 6 | 15.2 | 24.5 |
| 2-3 | 10 | 24.8 | 40.2 |
| 2-4 | 14 | 35 | 57.3 |

Figure 5:
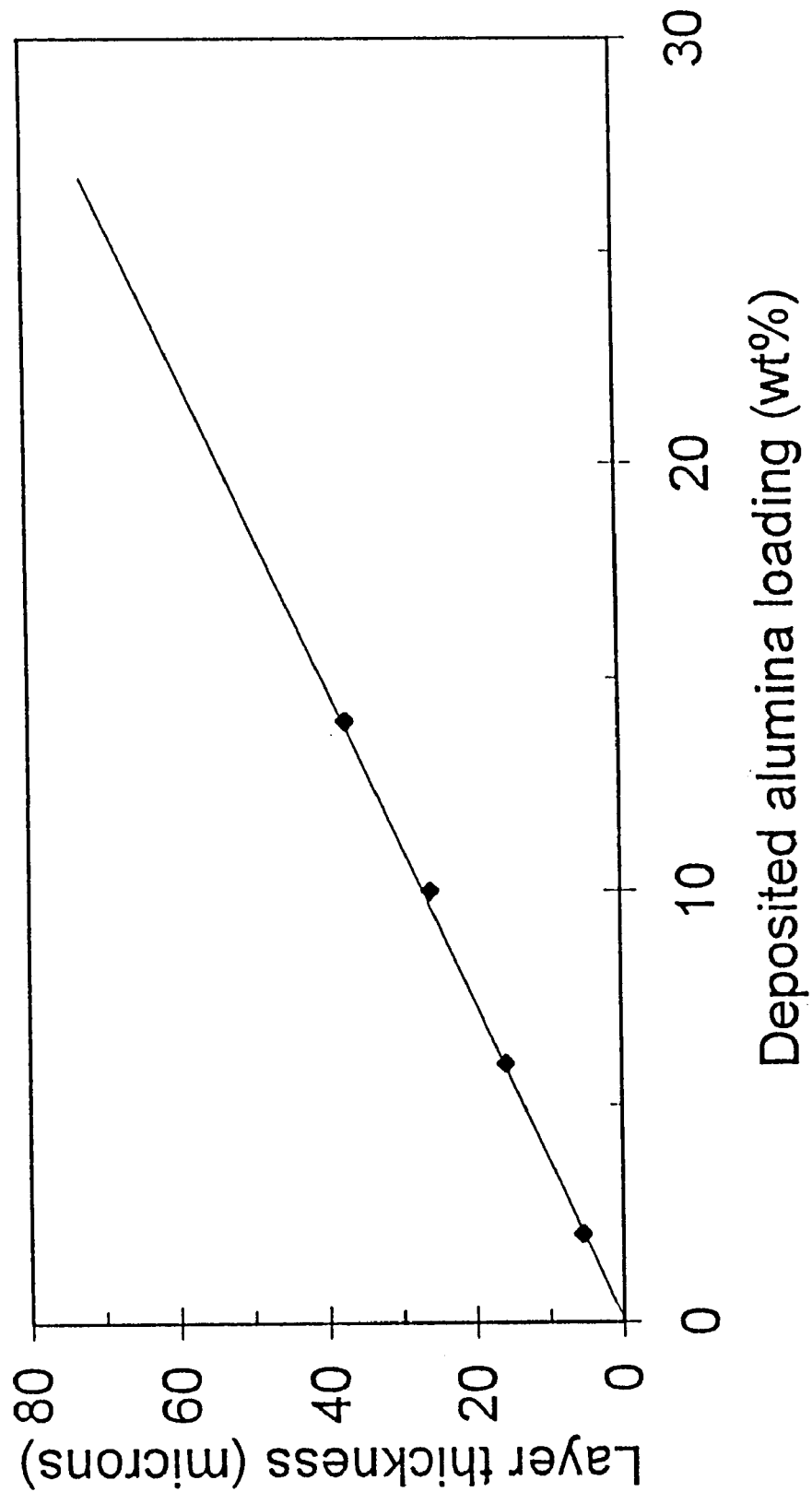
FIG. 5 is a graph illustrating the thickness of the film deposited on 1 mm α-alumina spheres as a function of the loading using a slurry of non-colloidal alumina particles.

FIG. 5 represents the layer thickness as a function of the deposited transitional alumina loading level. As can be seen, the calculated loading increased linearly. In addition, fines formation was not apparent over this range of film thicknesses, and the total mass balance of material in the Wurster coater indicated almost 100% coating efficiency.

Figure 6A:
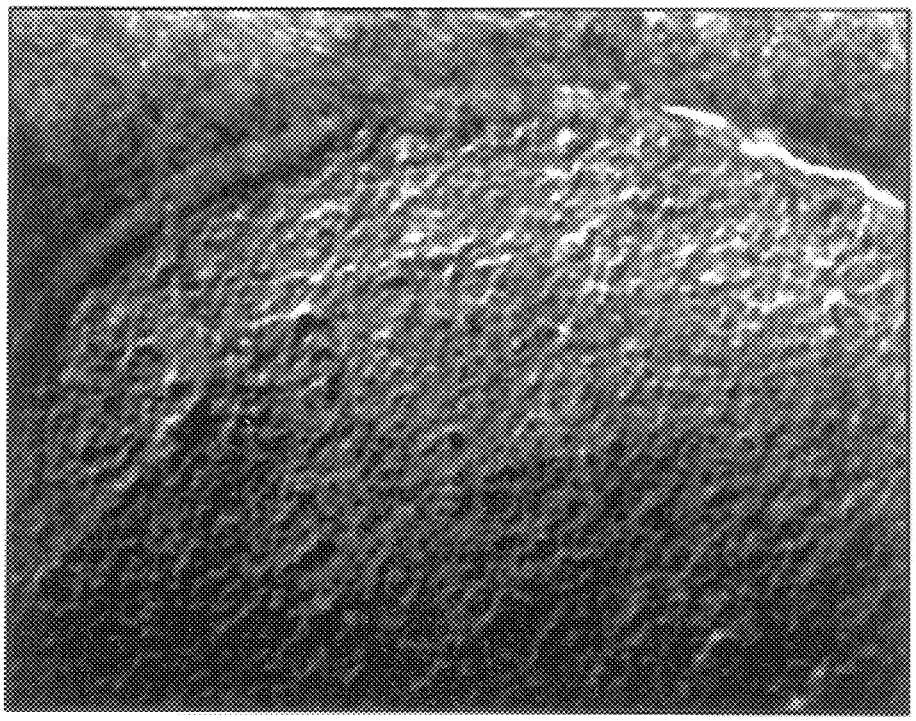
FIG. 6A is a cross-sectional scanning electron microscope image of a non-colloidal, transitional alumina slurry coated on 1 mm α-alumina spheres with a 6 wt. % loading and calcined at 500° C.
Figure 6B:
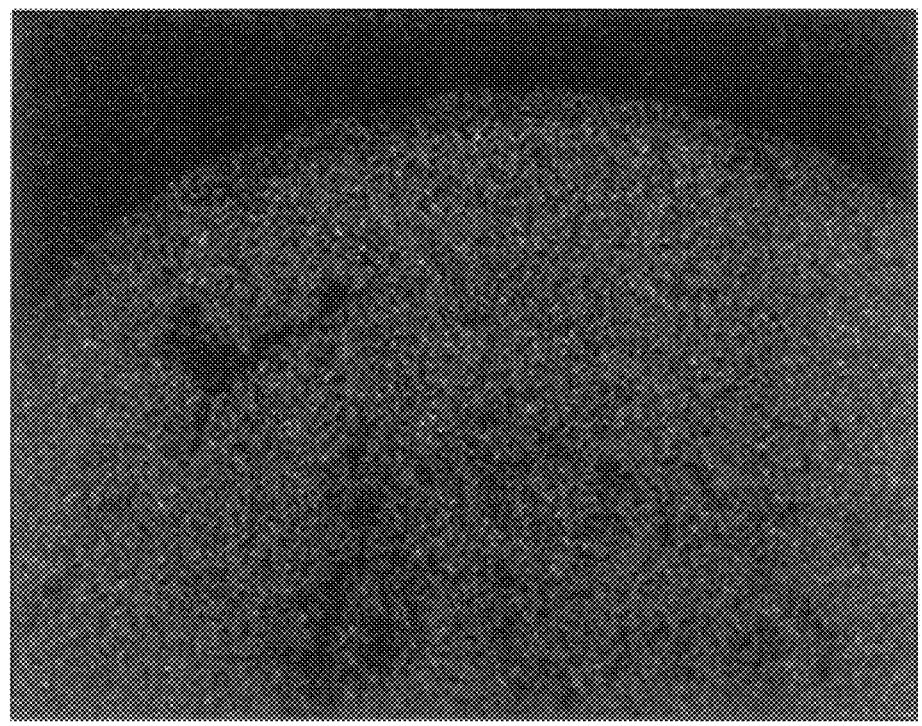
FIG. 6B is a cross-sectional EDAX aluminum map of the same particles as in FIG. 6A.

FIGS. 6A and 6B show a cross sectional SEM analysis performed on the sample having an installed loading of 6 wt %. A homogeneous film around the inner alpha-alumina core can be observed. It seems that the layer from the slurry precursor, though very homogenous, has a less compact structure than that prepared from a sol precursor as described in Example 1. Once again, the aluminum mapping represented in FIG. 6B showed no impurities in the film. Furthermore, it was found that all particles were coated with a film of equal thickness. Higher magnifications show that the coating was deposited at the surface, and did not penetrate the inner surface of the wide-porous alpha-alumina substrate. The coating thickness measured from the SEM pictures is about 25 microns. This example serves to show that uniform films are formed by depositing a milled transitional alumina onto a porous alpha-alumina particle using the fluid bed coating procedure of this invention.

EXAMPLE 3

The thin film transitional alumina on 1 mm alpha-alumina sample, prepared by fluid bed coating as described in Example 1, was impregnated with nickel nitrate in water by the dry, or incipient wetness, method to make a catalyst containing 15 wt. % nickel on the basis of the alumina thin film. The sample was dried at 120° C. for 1 hour and calcined at 500° C. for 1 hour. The nickel dispersion was measured using hydrogen chemisorption. The nickel dispersion obtained was 30%. A 30% dispersed nickel catalyst has nickel metal particles of about 2 nm diameter. This dispersion is the same as a commercial nickel catalyst on an alumina which contains this same level of nickel in the catalyst. For comparison purposes to this example, a material was made by sequential additions of 10% sol in water using the dry, or incipient wetness, method of preparation where the same sol was employed to make the fluid bed sample. This sample was prepared on the same 1 mm alpha-alumina spheres as that used in the fluid-bed-coated sample. The loading of the transitional alumina was similar for both samples. The nickel nitrate solution was impregnated as described in the case of the fluid-bed-coated sample, and then the sample was dried and calcined in an analogous manner. By examining the fluid-bed-coated sample and the hand-coated samples under an optical microscope, it was obvious that the samples were very different. In the case of the hand-coated sample there were dark and light patches over the exterior surface of all of the particles observed in the microscope. In the case of the fluid-bed-coated sample, the surface was completely uniform in color for all of the particles observed in the microscope. For the hand-coated sample the nickel dispersion was measured and found to be 10%. This example serves to demonstrate that higher nickel dispersions are obtained on the fluid-bed-coated sample compared to that of the hand-coated sample, and further demonstrates that a continuously uniform coating is obtained only in the case of the fluid-bed-coated material. Detailed SEM micrographs of the fluid-bed-coated samples of Examples 1 and 2, show that a very uniform outer thin film has been formed, and, also, that there is no penetration of the alumina sol into the interior of the core of alpha-alumina. The uniformity of the thin film coating is clearly critical to obtain the 30% nickel dispersion that we have obtained in the case of the fluid-bed-coated sample. Thus, having a uniform alumina thin film has major consequences for the case where high nickel dispersions are essential such as in the case of hydrogenation catalysis.

EXAMPLE 4

Figure 7A:
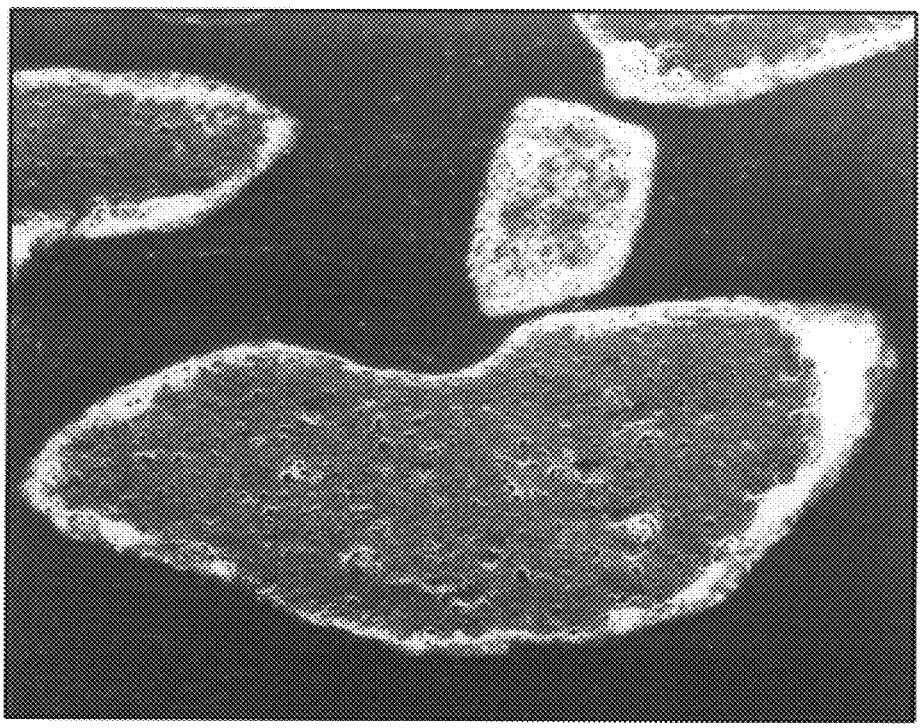
FIGS. 7A and 7B are cross-sectional scanning electron microscope images of two different fractions of a sample with 1 wt. % portions of an alumina sol impregnated onto α-alumina.
Figure 7B:
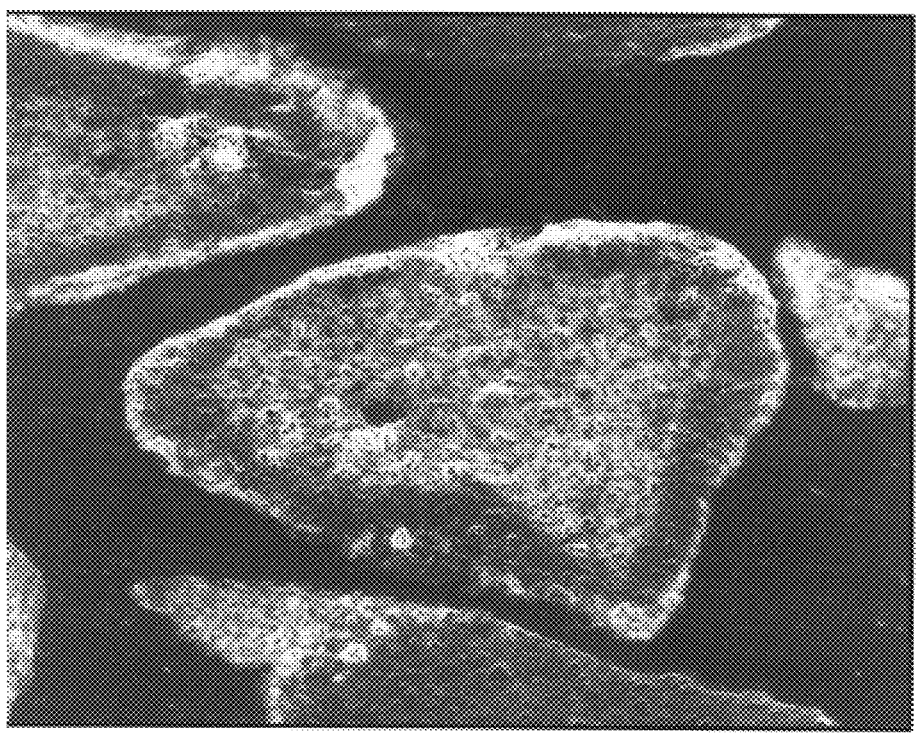
Figure 8A:
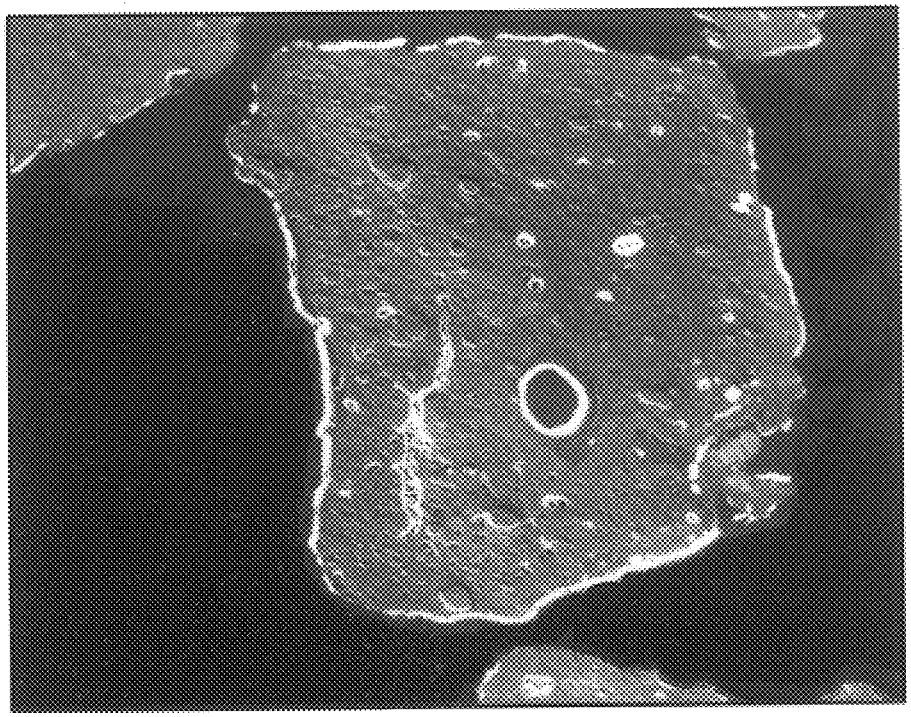
FIGS. 8A and 8B are cross-sectional scanning electron microscope images of two different fractions of a sample with 5 wt. % portions of the alumina sol impregnated onto α-alumina.
Figure 8B:
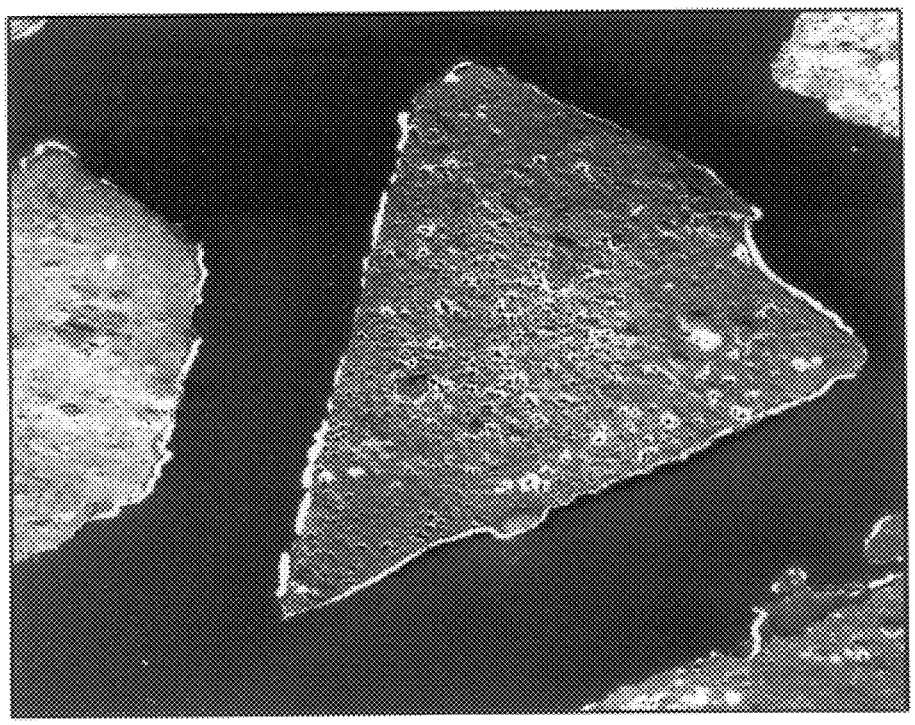

An alumina sol of 2–3.5 nm size was added to an alpha-alumina by the dry, or incipient wetness, preparation method. The alpha-alumina was a material of 14 $m^2/g$ surface area, and had a mixture of meso- and macropores, which is consistent with this relatively high surface area for an alpha-alumina material. Various methods were used to prepare the sol on the 1 mm size alpha-alumina. In one case, the sol was impregnated in 1 wt. % increments for 5 times. For this sample the SEM micrograph showed clearly that the sol had penetrated quite uniformly into the particles, and that the desired thin film on the exterior surface of the alpha-alumina particles was not present. This is shown in FIGS. 7A and 7B which are SEM's of two different samples. In yet another case, the sol was impregnated in two increments of 5 wt %. In this sample, the sol was deposited on the interior of the particle, and, also, on the exterior surface of the alpha-alumina. The exterior coating was irregular and uneven as is shown by the two samples shown in FIGS. 8A and 8B. This example is used by way of comparison to the fluid-bed-coated samples of other examples where uniform coatings are formed by sol addition to an alpha-alumina support material.

It can be seen from the description and the examples that the present invention involves the use of a specific type of coating process to form catalyst materials which are unique and superior to those catalyst materials formed by prior art coating processes. The invention as described herein is intended to include all embodiments encompassed by the appended claims.

What is claimed is:

1. In a process for producing a thin film catalyst comprising porous core particles and a thin film of catalyst thereon, the improvement comprising coating said porous core particles by contacting a fluidized bed of said porous core particles with an atomized spray of a liquid suspension of fine coating particles, at least a portion of said fine coating particles being colloidal particles and said fine coating particles being selected from the group consisting of particles possessing catalytic activity and particles adapted to be treated to produce catalytic activity, said fine coating particles being coated on the surface of said porous core particles to form a thin film essentially without any penetration into said pores.

2. A process as recited in claim 1 wherein said fine coating particles are particles adapted to be treated to produce catalytic activity and further comprising the step of treating said thin film of fine coating particles to produce said catalytic activity.

3. A process as recited in claim 2 wherein said step of treating comprises the step of chloriding to produce acid catalyst activity.

4. A process as recited in claim 2 wherein said step of treating comprises the step of depositing a metal precursor on said thin film.

5. A process as recited in claim 4 wherein said metal precursor contains a metal selected from the group consisting of copper, molybdenum, manganese, rhenium and the Group VIII metals of the Periodic Table of Elements.

6. A process as recited in claim 1 wherein said fine coating particles are a precursor of a transitional alumina.

7. A process as recited in claim 6 wherein said transitional alumina precursor is boehmite or pseudoboehmite.

8. A process as recited in claim 2 wherein said step of treating comprises the step of acidifying said fine coating particles.

9. A process as recited in claim 8 wherein said step of acidifying is selected from the group of steps consisting of halogenating and sulfating.

10. A process as recited in claim 2 wherein said step of treating is selected from the group of steps consisting of reducing, oxidizing and sulfiding and combinations thereof.

11. A process as recited in any one of claims 1, 2, 3, 4, 5, 6, 7, 8, 9, and 10 wherein said core material is non-catalytic.

12. A process as recited in any one of claims 1, 2, 3, 4, 5, 6, 7, 8, 9, and 10 wherein said core material is alpha-alumina.

13. A process as recited in any one of claims 1, 2, 3, 4, 5, 6, 7, 8, 9 and 10 wherein said core material is selected from the group consisting of alpha-alumina, transitional alumina, silica, zeolites, zirconia, titania, clay minerals, silicon carbide and mixtures thereof.

14. A process as recited in claim 1 wherein said core material is alpha-alumina, said fine coating particles are milled transitional alumina and said liquid suspension is formed by ball milling said transitional alumina together with acetic acid thereby forming a sol binder.

15. A method as recited in claim 1 wherein said step of contacting a fluidized bed of said porous core particles with an atomized spray comprises the steps of repeatedly spraying said particles with said atomized spray and drying said sprayed particles between said repeated sprayings whereby a series of partial coatings are applied to said core particles to collectively form said thin film.

16. The process as recited in any one of claims 1, 2, 3 to 10 and 14 to 15 wherein said porous core particles have a particle size of from 0.03 to 1.0 mm.

17. A process as recited in claim 16 wherein said thin film of fine coating particles has a thickness of less than 75 μm.

18. A process as recited in claim 16 wherein said fine coating particles have a particle size of from 2 to 100 nm.

19. A process as recited in claim 1 wherein said core material is alpha alumina and said fine coating particles are colloidal alumina.

20. A process as recited in claim 1 wherein said core material is alpha alumina and said fine coating particles are a mixture of colloidal alumina and milled transitional alumina.

21. A process for producing catalyst particles comprising porous core particles and a thin shell of catalyst deposited on the surface of said porous core particles comprising the steps of:

(a) providing porous core particles having a particle size range of 0.03 to 1.0 mm;

(b) providing a liquid suspension of fine shell particles, said shell particles being adapted to be treated to produce catalytic activity and at least a portion of said fine shell particles being colloidal particles;

(c) repeatedly subjecting said porous core particles in a fluidized bed coating process to the steps of:
  (i) spraying said porous core particles with an atomized spray of said liquid suspension, and
  (ii) drying said liquid suspension on said porous core particles thereby leaving successive coatings of said fine shell particles on the surface of said porous core particles without penetration into the pores of said porous core particles and thereby building up said thin shell on said surface of said porous core particles; and (d) treating said thin shell of said fine shell particles to produce said catalytic activity.

22. A coated particle adapted to be converted to a catalyst particle comprising a porous core particle and a thin shell of coating particles of uniform thickness deposited on the surface of said porous core particle essentially without any coating particles deposited in said pores wherein said coated particle is formed by the process of any one of claims 1, 6, 7, 14 and 15.

23. A catalyst particle comprising a porous core particle and a thin shell coating particle of uniform thickness deposited on the surface of said porous core particle essentially without any coating particles deposited in said pores wherein said catalyst particle is formed by the process of any one of claims 2, 3, 4, 5, 8, 9 and 10.

24. A process as recited in claim 15 wherein said atomized spray is directed upwardly co-current with the upwardly moving fluidized particles.

* * * * *

UNITED STATES PATENT AND TRADEMARK OFFICE
CERTIFICATE OF CORRECTION

PATENT NO. : 5,935,889
DATED : August 10, 1999
INVENTOR(S) : Murrell et al.

It is certified that error appears in the above-identified patent and that said Letters Patent is hereby corrected as shown below:

<u>Column 11,</u>
Line 61, delete "method" and replace with -- process --.

Signed and Sealed this

Twenty-first Day of August, 2001

*Attest:*

*Nicholas P. Godici*

*Attesting Officer*

NICHOLAS P. GODICI
*Acting Director of the United States Patent and Trademark Office*